May 3, 1960 C. M. FRITZ 2,935,218
VEHICLE WITH VERTICALLY ADJUSTABLE CARGO PLATFORM
Original Filed April 16, 1956 4 Sheets-Sheet 1
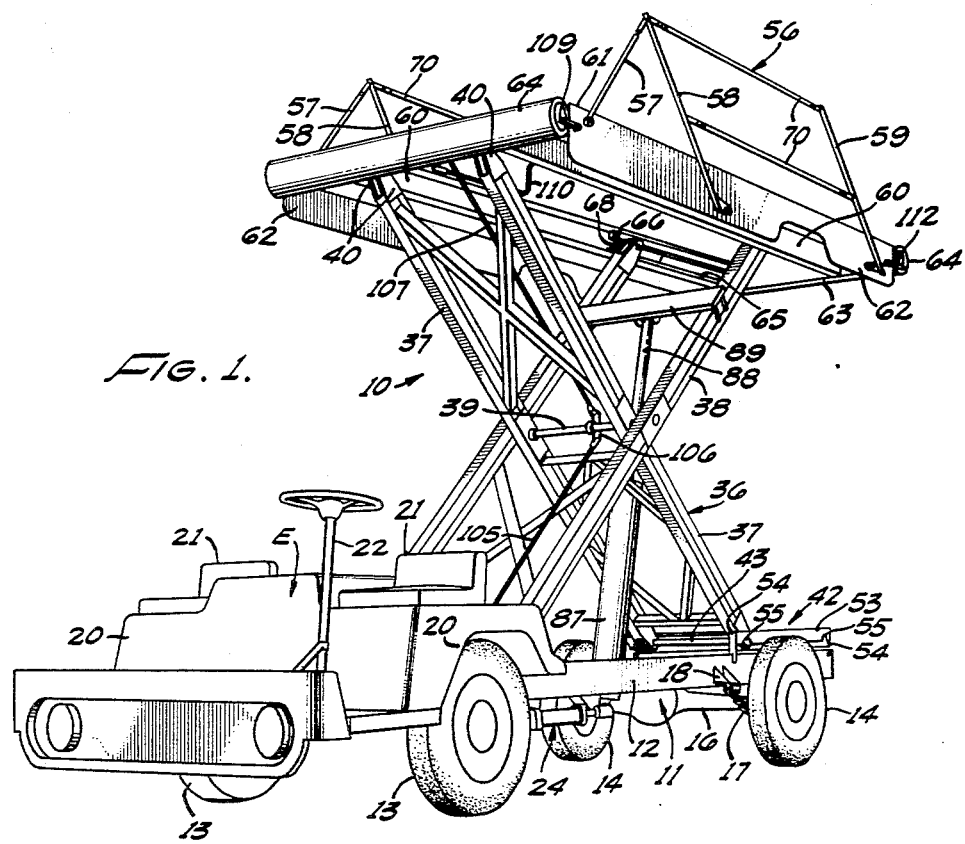
FIG. 1.
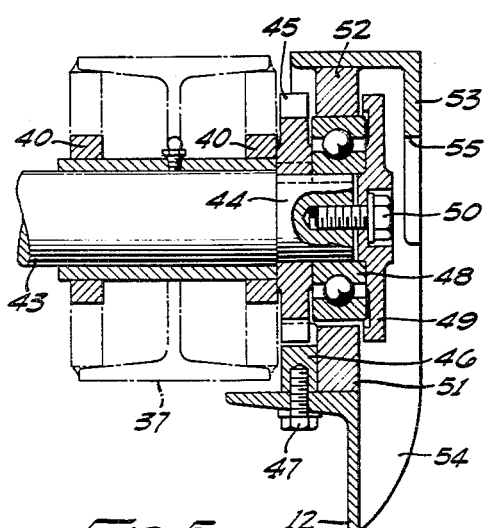
FIG. 5.
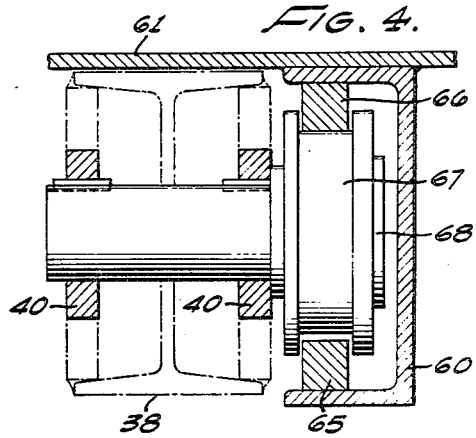
FIG. 4.
INVENTOR.
CONRAD M. FRITZ
BY
ATTORNEY May 3, 1960 C. M. FRITZ 2,935,218
VEHICLE WITH VERTICALLY ADJUSTABLE CARGO PLATFORM
Original Filed April 16, 1956 4 Sheets-Sheet 2
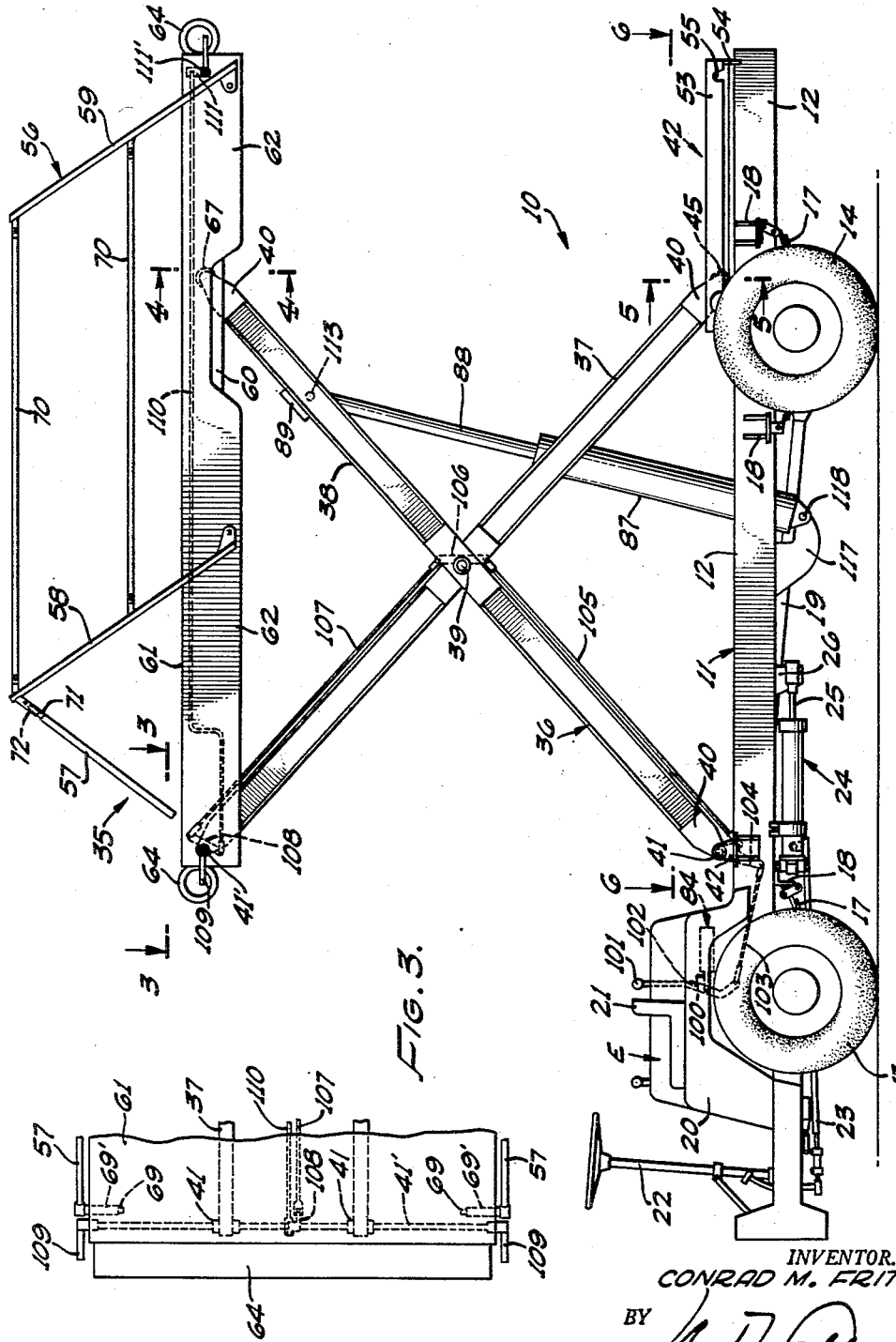
INVENTOR.
CONRAD M. FRITZ
BY
ATTORNEY May 3, 1960     C. M. FRITZ     2,935,218
VEHICLE WITH VERTICALLY ADJUSTABLE CARGO PLATFORM
Original Filed April 16, 1956     4 Sheets-Sheet 3
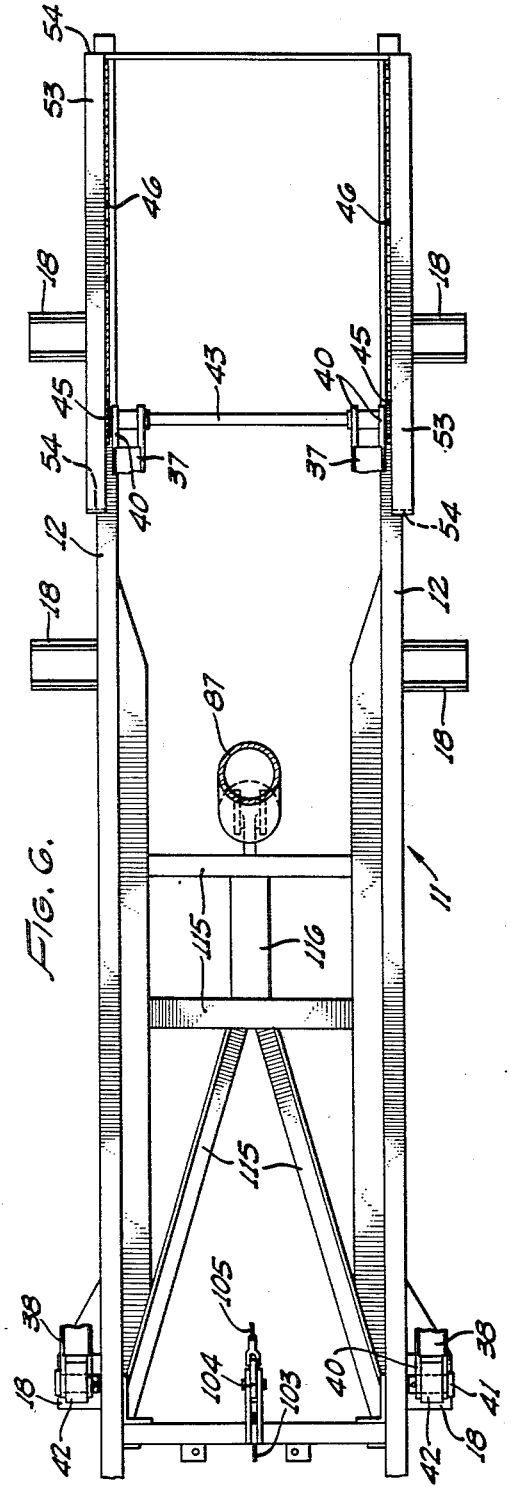
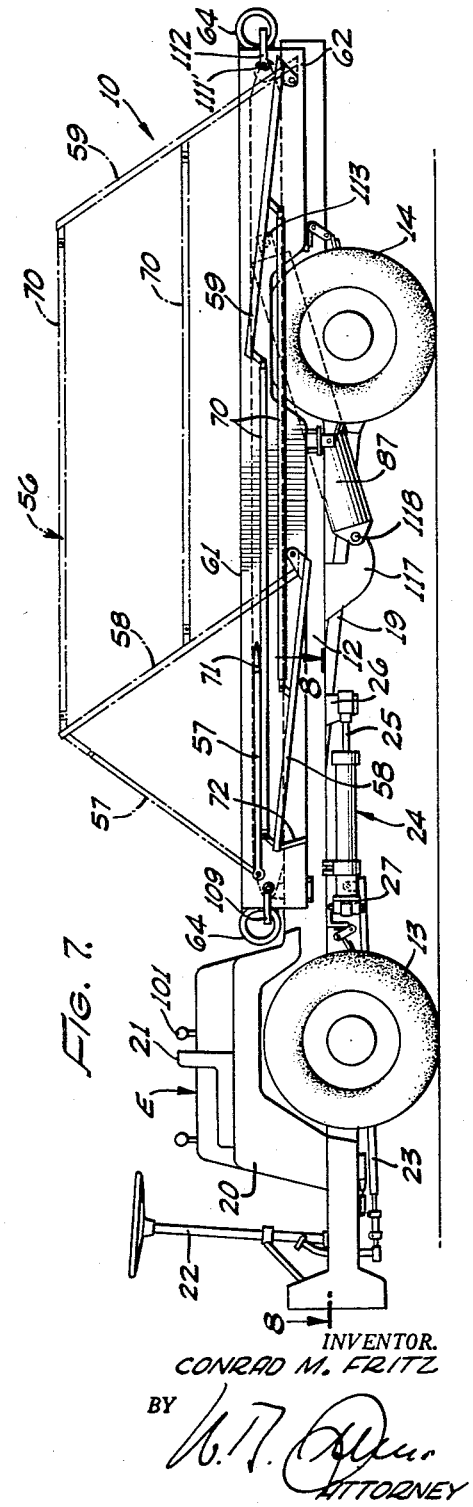
INVENTOR.
CONRAD M. FRITZ
BY
ATTORNEY

INVENTOR.
CONRAD M. FRITZ

United States Patent Office 2,935,218
Patented May 3, 1960

2,935,218

VEHICLE WITH VERTICALLY ADJUSTABLE CARGO PLATFORM

Conrad M. Fritz, Los Angeles, Calif., assignor to Keystone Engineering Company, Los Angeles, Calif., a partnership Continuation of application Serial No. 578,426, April 16, 1956. This application March 3, 1958, Serial No. 719,183

12 Claims. (Cl. 214—512)

This invention relates to vehicles and more particularly to a truck having a vertically adjustable cargo platform incorporating numerous new and improved features adapting it for the handling of aircraft cargo.

This is a continuation of my application for United States Letters Patent Serial No. 578,426, filed April 16, 1956, now abandoned, entitled Vehicle With Vertically Adjustable Cargo Platform.

The transfer of cargo to and from planes speedily at air terminals by a minimum number of crewmen and without risk of damage to the cargo or the aircraft presents a troublesome problem. Endless belt conveyors of various types have been in general use but are subject to certain disadvantages. For example, such conveyors serve merely to elevate the cargo between ground level and the plane, extra handling operations being required at both ends of the conveyor to transfer the cargo to and from the conveyor. Separate power sources are also required to operate the conveyor and to transport the cargo between the conveyor and the terminal building.

Power driven trucks having vertically adjustable cargo platforms obviate some of the disadvantages of the endless conveyor transfer devices, but are also subject to certain disadvantages. For example, the collapsing supporting mechanisms for the cargo platform of prior truck designs are so bulky and complex as to prevent the lowering of the platform sufficiently for the convenient loading and unloading of baggage by a crewman standing on the ground. Also the maximum extension of the platform is less than required for the larger commercial planes now in operation. Other disadvantages of prior designs include inadequate stability of the platform in its elevated position, the lack of controls located on the platform for raising and lowering the platform, and the lack of a simple, powerful and fast-acting power actuating system for elevating and retracting the platform.

In view of the foregoing factors and conditions characteristic of aircraft cargo handling facilities, it is a primary object of the present invention to provide a new and improved truck not subject to the disadvantages enumerated above and having a vertically extendible platform especially designed for transferring cargo between ground level and the cargo space of aircraft efficiently, safely and expeditiously.

Another object of the invention is to provide a truck for transferring cargo from the terminal building directly to the cargo space of an aircraft incorporating a vertically adjustable platform arranged to be elevated hydraulically by the vehicle-propelling motor and wherein the position of the platform is controllable selectively from one or more control stations on the platform and on the truck body.

Still another object of the invention is to provide a vertically adjustable truck platform supported by a scissors linkage collapsible to a convenient ground-level loading height and arranged to be extended to the level of a plane cargo door by a single stage hydraulic ram power unit.

A further object of the invention is to provide a vertically adjustable truck platform supported by a pair of scissors beams and incorporating a stabilizer for the lower end of one of the scissors beams in a manner assuring maximum stability of the platform despite non-uniform distribution of the load thereon.

Yet another object of the invention is to provide a new and improved arrangement for elevating a scissors-supported truck platform by a single stage hydraulic ram in a manner providing maximum lifting power in the collapsed position of the scissors and elevation of the platform to a maximum height.

Another object of the invention is to provide a vertically adjustable truck platform having cargo guard rails providing maximum cargo protection and a minimum risk of damage to the aircraft during the elevation of the platform and the maneuvering of the truck beneath the plane.

A further object of the invention is to provide a cargo handling truck of unusual compactness, maneuverability, simplicity, and incorporating a platform adjustable to any desired height by an operator positioned on the platform.

Yet another object of the invention is to provide a hydraulically-powered scissors-supported truck platform with a mechanical control linkage operable from one or more stations on the platform and so arranged that the vertical movement of the platform does not vary the control position of the linkage or of the hydraulic valve actuated thereby.

Another object of the invention is to provide a vertically adjustable truck platform with guard rails permanently assembled to the sides of the platform and selectively positionable in either a guard position or a non-guard position folded downwardly along the sides of the platform.

These and other more specific objects will appear upon reading the following specification and claims and upon considering in connection therewith the attached drawings to which they relate.

Referring now to the drawings in which a preferred embodiment of the invention is illustrated:

Figure 1 is a view in perspective of a truck incorporating the features of the present invention and showing the cargo platform elevated substantially to its maximum height;

Figure 2 is a side elevational view of the truck with the platform in an elevated position;

Figure 3 is a fragmentary sectional view taken on line 3—3 of Figure 2 showing the means for selectively supporting the guard rails in an upright guard position, the downwardly folded position of the guard rails being indicated in dot and dash lines;

Figure 4 is a fragmentary vertical section taken on line 4—4 of Figure 2 showing the longitudinally traveling roller connection between the cargo platform and the upper end of the outer scissors beams;

Figure 5 is a vertical sectional view taken on line 5—5 of Figure 2 showing certain details of the stabilizer means provided between the traveling lower end of the inner scissors beam and the truck chassis;

Figure 6 is a top plan view of the portion of the truck chassis underlying the cargo platform and taken along the plane indicated by line 6—6 on Figure 2;

Figure 7 is a side elevational view of the truck showing the cargo platform fully retracted against the truck chassis;

Figure 8:
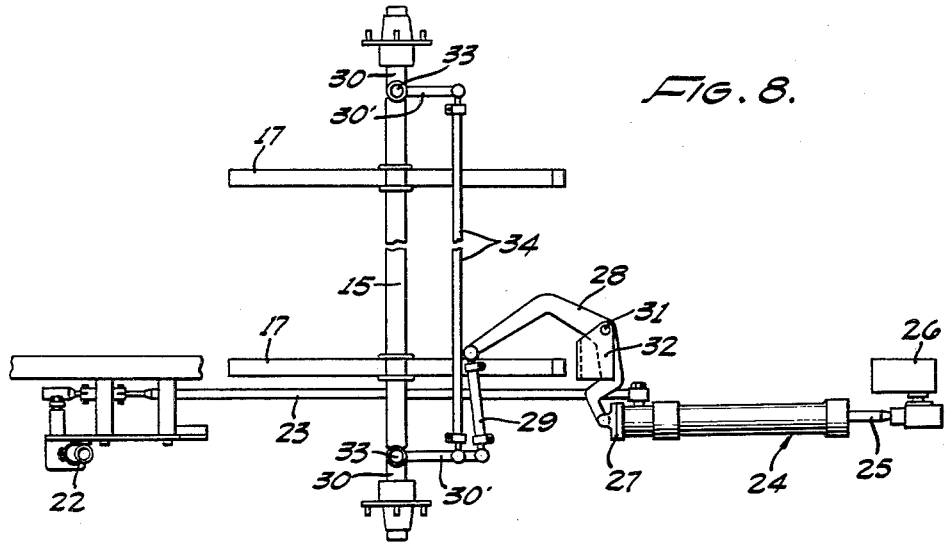
Figure 8 is a fragmentary view of the front axle of the truck and the steering linkage therefor taken on line 8—8 of Figure 7.

Referring again to the drawings and particularly to

Figures 1, 2, 6 and 7, the truck constituting the present invention, generally designated 10, includes a chassis 11 having a horizontally disposed main frame formed by a pair of inwardly facing channel members 12, 12 suitably interconnected by cross members welded thereto. The main frame is supported by pairs of front and rear wheels 13, 14, respectively, each pair being mounted on axles 15, 16 extending crosswise beneath the opposite ends of the main frame and resiliently connected to its opposite sides by conventional leaf springs 17 and brackets 18. Suitably supported at the forward end of the chassis overlying the front wheel assembly is a low height internal combustion engine E suitably connected in a well known manner to the rear wheel assembly through a suitable transmission, not shown, and a drive shaft 19. It will be understood that the vehicle is provided with the usual brake system for the wheels, a clutch pedal and other engine control levers customarily required for the operation of the truck.

The steering wheel column 22 is suitably anchored to the forward left-hand corner of the chassis forwardly of an operator's seat 21, the latter being mounted on one of the fenders 20 overlying front wheels 13. The lower end of the steering column shaft is connected in a well known manner to the forward end of a drag link assembly 23. The rear end of the drag link is connected to the valve control stud 23' of a four-way valve forming part of a conventional power steering booster 24 arranged longitudinally along the side of the chassis. The casing of this booster is movable lengthwise of a piston enclosed thereby and has a piston rod 25 pivotally connected to chassis frame member 12 through a bracket 26. The movable forward end 27 of the booster casing is movably connected to one end of a bell crank 28 pivoted by a vertically disposed pin 31 to a bracket 32 secured to chassis frame member 12. The front wheels 13, 13 are mounted in the usual manner on the oppositely directed axle portions of a pair of L-shaped members 30 pivoted to the ends of front axle 15 by vertically disposed king pins 33. The rearwardly projecting steering arms 30' of members 30 are interconnected by a tie rod 34 and the steering arm for the left wheel is connected by a link 29 with the forward end of bell crank 28.

The cargo platform generally designated 35 is arranged to be adjusted to any desired vertical position by an extendible scissors framework generally designated 36 interposed between platform 35 and chassis 11. Scissors framework 36 comprises an inner scissors beam 37 and an outer scissors beam 38 pivotally interconnected at their mid-sections by a shaft 39. As is best shown in Figure 1, each of the scissors beams 37, 38 comprises a pair of I-beams rigidly interconnected by cross bracing so arranged that the inner beam can fold substantially within the confines of the outer beam, as is illustrated in Figure 7. The ends of the scissors beams are provided with pairs of gusset plates 40 having converging terminal ends. Each pair of plates has aligned openings to seat either a pivot pin or a roller means depending upon whether the beam end has a fixed or a traveling pivot. It will be understood that either the forward or the rear ends of the respective scissors beams can be connected to the chassis and cargo platform by fixed pivots or by traveling pivots but, as herein illustrated, the forward ends of the beams are provided with fixed pivots. Thus, the forward ends of outer scissors beam 38 are connected by pivot pins 41 and brackets 42 to the upper edges of chassis frame members 12, 12 rearwardly of engine E. A pair of similar pivot pins 41 provide a fixed pivotal connection between the upper ends of scissors beam 37 with the lower forward end of the cargo platform 35.

Referring to Figures 2, 5 and 6, the traveling pivot connection between the rear end of beam 37 and the chassis frame members 12, 12 will be seen to comprise the stabilizer assembly generally designated 42. This assembly includes a large diameter torsion shaft 43 having its opposite ends rotatably supported in bearing sleeves secured to pairs of gusset plates 40 welded to the lower ends of beam 37. Keyed to the reduced diameter ends 44 of shaft 43 are spur gears 45 the teeth of which mesh with the teeth of rack gears 46, the latter being secured to the upper flange of the chassis frame members 12, 12 by cap screws 47. A roller bearing assembly 48 is mounted upon the outer ends of shaft 43 and each is secured in place by a face plate 49 and by a cap screw 50 in the manner shown in Figure 5. Since the spur gears are keyed to the shaft and mesh with the rack gears 46, it will be apparent that the opposite lower corners of scissors beam 37 roll along the rack gear at the same rate and by like distances and any tendency for the lower corners of the beam to move differently from one another will be resisted in full by the torsional strength of shaft 43 and the engagement of spur gears 45 and rack gears 46.

The spur gears are held in mesh with the rack gears by means of a pair of parallel guide rails 51, 52 extending longitudinally of the chassis directly above and below the roller bearing 48. Lower guide rail 51 is rigidly secured to the outer face of rack gear 46 held assembled to channel member 12 by cap screws 47, while the upper guide rail 52 is welded to the inner face of the laterally extending flange of angle iron member 53, the downturned opposite ends 54 of which are welded to the chassis channel member 12.

To facilitate assembly and disassembly of the stabilizer with respect to the truck chassis, the vertical flange of member 53 is provided with one or more cutouts 55 providing access to cap screw 50 holding face plate 49 to the end of shaft 43.

The cargo platform generally designated 35 and best illustrated in Figure 1, comprises a pair of channel-shaped main supporting members 60, 60 arranged parallel to one another opposite the upper ends of scissors beams 37 and 38. Rigidly secured to the upper edges of channel members 60 by welding or otherwise is a sheet metal decking 61 having downturned flanges 62 along its lateral sides. The opposite ends of the platform are suitably reinforced as by cross-channel members 63 secured across the ends of channel members 60 and to the inner faces of deck flanges 62. Supported along the exterior faces of channel members 63 are a pair of tubular rubber bumper members 64, 64 which serve to protect the plane against contact by the ends of the cargo platform.

As explained above, the forward end of the platform has a fixed pivotal connection with the upper ends of beam 37 provided by pivot pins 41 extending through gusset plates 40 of scissors beam 37 and the platform channel members 60. As will be explained presently, the upper pair of pivot pins 41 have an axial opening providing a bearing for a shaft 41' extending across the front end of the platform and forming a part of the control linkage for the platform elevating ram 87. The upper ends of the outer scissors beam 38, like the corresponding lower end of scissors beam 37, have a traveling pivot connection with the platform. This pivot connection includes a pair of parallel guide rails 65, 66 secured to the facing sides of the lateral flanges of the platform channel members 60, 60, as is best shown in Figure 4. The facing edges of guide rails 65, 66 extend into a wide groove formed in the rim of a roller 67 rotatably supported on a headed pin 68 rigidly secured to the aligned openings in gusset plates 40 carried by the upper ends of scissors beam 38. As made clear by Figure 4, the groove in each roller 67 is wider than guide rails 65 and 66 and the spacing between the opposed faces of the guide rails is slightly greater than the diameter of the groove portion of the roller. Since the platform weight acts downwardly on rollers 67, it will be apparent that the upper guide rail 67 is a load supporting member whereas lower rail 65 serves primarily to hold the scissors beam assembled to the platform and to guide the movement of the rollers lengthwise of the platform as it is raised and lowered.

To safeguard the cargo, the opposite sides of the platform are preferably provided with guard rails 56 formed by pivotally connected sections of tubing. These rails are securely assembled to the platform and are adapted to be extended to a rigid upright position, as illustrated in Figures 1 and 2, or collapsed compactly against the sides 62 of the platform as illustrated in Figure 7 as is customary during the transfer of cargo in the lowered position of the platform. As is best shown in Figure 2, each guard rail comprises three leg members 57, 58 and 59 each of which is provided at its lower end with a short trunnion 69 rigidly secured thereto by a suitable bracket welded to the leg members. Trunnions 69 seat in cooperating bearing tubes 69' secured to the inner sides of platform flanges 62 and opening therethrough. Trunnions 69 are held assembled within tubes 69' as by cotter pins extending through the inner ends of the trunnions closely against the inner ends of the bearing tubes. Pivotally connecting the upper ends and midportions of leg members 58 and 59 are a pair of equal length tubes 70. It will therefore be evident that legs 58, 59 and the horizontally extending tubes 70 form a parallel linkage pivotally supported along the sides of the platform by trunnions 69 and bearing tubes 69'.

The guard rail linkage is adapted to be rigidly supported in its extended or upright position shown in Figures 1 and 2 by leg member 57, the upper end of which is arranged to be quickly coupled and uncoupled from the upper end of leg member 58. In a preferred coupling, the tapered upper end 71 of leg member 57 is formed to telescope snugly into a socket 72 secured to the upper end of leg member 58, socket 72 being so positioned on leg 58 as to be in alignment with tapered end 71 when legs 58 and 59 are inclined toward the forward end of the truck and leg 57 is similarly inclined toward the rear of the truck. It will be understood that a spring pressed latch or the like not shown is preferably mounted on socket 72 for locking members 71 and 72 coupled together.

The inclination of the guard rail legs to the vertical and in opposite directions to one another serves two important purposes. For example, the opposite inclination of leg 57 with respect to legs 58 and 59 provides a simple and effective means for supporting the rail assembly rigidly in its upright or extended position as well as for urging together the two halves 71 and 72 of the coupling between leg 57 and the parallel linkage portion of the assembly. A second and equally important advantage is that legs 57 and 59 at the opposite ends of the rail are sharply inclined toward one another and away from the ends of the cargo platform. As a result either end of the platform may be elevated to a position opposite an opening in a plane fuselage without danger of the guard rail ends coming in contact with the fuselage and puncturing the same. It will also be recognized that since all parts of the guard rails are securely assembled to the platform, it is impossible for the crew to detach the guard rails while servicing a plane and then forget to replace them. Failure to return the rails to the truck at the end of the plane servicing operation creates a serious hazard to the plane if not discovered by the pilot before he attempts to move the plane.

Figure 9:
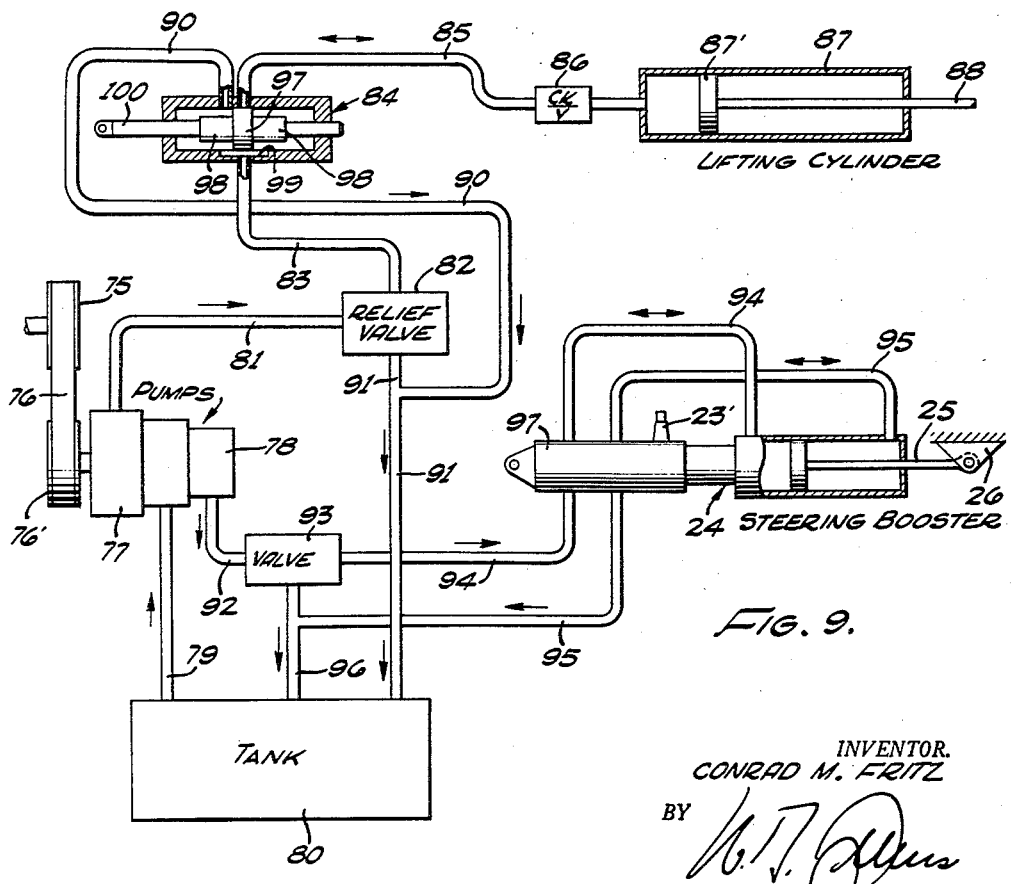
Figure 9 is a schematic view of the hydraulic system employed to elevate the cargo platform and to provide assistance in steering the front wheels of the truck.

The power means for elevating the cargo platform comprises a hydraulic system powered directly from the vehicle motor E and includes the essential components illustrated in Figure 9. The power driving connection between the engine and the hydraulic system includes a suitable clutch, not shown, driving a pulley 75 connected by a belt 76 to a common driving pulley 76' for a pair of hydraulic pumps 77, 78. These pumps also have a common supply connection 79 with a hydraulic fluid storage tank 80, but otherwise operate independently, pump 77 supplying pressurized fluid for the operation of the hydraulic ram for raising the cargo platform and pump 78 supplying pressurized fluid to the steering booster device 24.

Fluid to operate the scissors elevating ram 87 passes from the outlet of pump 77 through conduit 81, relief valve 82 and conduit 83 to a three-position, three-way valve, self-centering, of any suitable conventional design having an outlet port delivering fluid through a conduit 85 to an orifice type check valve 86 and the inlet side of a single stage hydraulic ram cylinder 87. A surplus flow and return-fluid conduit 90 extends from the three-way valve 84 to a conduit 91 connected between relief valve 82 and storage tank 80.

The three-way valve 84 controlling fluid flow to the power ram 87 includes a short piston 97 mounted between the ends of a piston rod 100 reciprocably supported in fluid tight openings at the opposite ends of the valve housing. The enlarged portions 98 of the piston rod to either side of piston 97 have ends positioned to engage the adjacent end walls of the valve housing to limit movement of the piston between the neutral position thereof illustrated in Figure 9 and a position to either side thereof for a purpose to be explained presently, it being understood that piston 97 automatically returns to its illustrated neutral position when not manually retained in a different position. The radial spacing between the surfaces of members 98 and the interior side walls of the valve housing permit flow of fluid between the inlet conduit 83 and either one or both of the outlet conduits 85 and 90, depending upon the position of piston 97 with respect to the adjacent ends of the last mentioned conduits. It will be understood that the open channel 99 formed in the inner wall of the valve housing opens into conduit 83 and has a length appreciably greater than the length of piston 97. Accordingly, at least one end of channel 99 remains uncovered by the piston in all operating positions of the latter.

Fluid to operate steering booster 24 passes from the outlet of pump 78 through a conduit 92 to a volume control valve 93 and through a flexible hose 94 to one end of the piston chamber of steering booster 24. The opposite end of this piston chamber is connected by a flexible hose 95 to a return conduit 96 extending between valve 93 and tank 80. Interposed between the opposite ends of flexible hoses 94 and 95 is a conventional four-way fluid valve 97 operable to meter the fluid to the booster piston in accordance with the demand for steering assistance as indicated by the movement of the drag link assembly 23 and the vehicle steering wheel. Inasmuch as the steering booster and its operation is well known and forms no part of the present invention, a more detailed description thereof will be unnecessary.

The linkage for controlling the position of the three-way valve 84 selectively from any one of several control stations on the cargo platform, as well as from the driver's position behind the steering wheel 22, will be described by reference to Figures 1 and 2. The forwardly projecting piston rod 100 of valve 84 is pivotally connected to an operating lever 101 pivoted by pin 102 to any suitable anchorage on the truck. The lower end of control lever 101 has a rigid link connection 103 to the longer arm of a Y-shaped lever 104 pivoted about the same axis as pivot pin 41 for the lower forward end of scissors beam 38. The shorter arm of lever 104 likewise has a rigid link connection 105 with a lever 106 having its center journaled on shaft 39 interconnecting the midsections of scissors beams 37 and 38. A third rigid link 107 extends between the upper end of lever 106 and a lever 108 keyed to the mid-portion of shaft 41' supported axially of pivot pins 41 between platform 35 and the forward end of scissors beam 37. Shaft 41' extends beyond the lateral sides of the cargo platform and has manual control levers 109 keyed to its ends and projecting forwardly opposite the ends of one of bumpers 64.

Preferably the control system for the platform elevating ram 87 includes a second pair of similar control stations at the rear end of the platform. Referring to Figure 2, it will be seen that provision for these stations includes a rigid rod 110 movably supported along the underside of the platform deck and having its forward end connected to the lower end of lever 108 and its rear end connected to the one end of a lever 111 keyed to a shaft 111' extending across the rear end of the platform. Each end of shaft 111' is provided with a control lever 112 fixed thereto and corresponding to control levers 109 described above. As illustrated in the drawings, each of the manual control levers 101, 109 and 112 for control valve 84 is in its neutral position and valve piston 97 is in the position illustrated in Figure 9 blocking flow of liquid through conduit 85 to or from the ram 87. Movement of any one of the control levers in either direction from the illustrated neutral position will move piston 97 and effect either the extension or the retraction of ram 87 and the raising or lowering of the cargo platform in a manner to be explained presently.

A particularly important feature of the invention relates to the structural relationship between the power supply ram 87 for scissors beams 37, 38 and the truck chassis proper. Figures 1 and 2 show the disposition of ram 87 and its associated parts with the cargo platform substantially fully extended, whereas Figure 7 shows the disposition of the power ram, the scissors and the truck chassis with the cargo platform fully retracted against the chassis. With the particular design and relationship of the scissors extending mechanism herein shown, a number of outstanding advantages are enjoyed which will be understood following a description of the ram and its structural relationship to certain other components. Preferably the power ram is of the single stage type having a cylinder 87 enclosing a piston 87' having a rod 88 extending from the rear end of the casing. The outer end of this rod is pivotally connected by a pin 113 to the mid-portion of a rigid cross beam 89 having its ends firmly welded to the opposite sides of scissors beam 38. The location of cross beam 89 is of considerable importance, as will be explained below, and preferably is located approximately midway between shaft 39 and the upper end of scissors beam 38.

The support for the lower end of the ram casing is best illustrated in Figures 2 and 6 wherein the main framework of the chassis is shown as strongly braced in its forward mid-section by heavy reinforcing members extending crosswise, lengthwise and at an angle to the side channel members 12, 12 to provide a rigid anchorage for the lower end of ram cylinder 87. Projecting downwardly and rearwardly from the longitudinal bracing member 116 is an L-shaped heavy-duty ram bracket 117 to which the lower end of ram 87 is pivoted by a pin 118. As clearly illustrated in Figure 7, the pivotal support thus provided for the lower end of the ram is spaced as close to ground level as is feasible so that, in the fully collapsed position of the platform, the ram is inclined by a substantial angle to the scissors beam. Consequently, the ram has an effective lever arm through which to initiate elevation of the platform. Furthermore, it will be recognized that a single stage ram connected in the manner described is effective to extend the scissors beams and cargo platform to a maximum extent with a minimum expenditure of energy.

Operation

Initially, the cargo platform will be retracted against the chassis as is illustrated in Figure 7 and guard rails 56 will be in their upright cargo guarding position. Assuming that it is desired to load baggage or other cargo aboard an aircraft, the cargo may be loaded across the rear end of the platform, or from either side if guard rails 56 are collapsed against the sides of the platform. The collapse of the guard rails is accomplished by pivoting the main portion of linkage assembly formed by legs 58, 59 and tubes 70 toward the rear of the platform the slight amount required to disengage coupling members 71 and 72. The linkage is then pivoted forwardly about trunnions 69 at the lower ends of the legs until all parts of the linkage lie folded compactly closely against the side flanges 62 of the platform and below the platform surface. Leg 57 is then pivoted rearwardly to overlie the collapsed linkage assembly. Due to the unusually low height of the fully retracted platform, the cargo can be loaded with ease by the crew while standing on the ground and without the necessity of having a man on the platform. Once the cargo is in place, the rails are swung upwardly and coupling members 71 and 72 are telescoped together to lock the rails rigidly in their fully extended upright position.

Taking his position on seat 21, the operator starts the engine and drives the truck to the plane stopping as either end of the cargo platform is opposite the edge of the cargo opening in the plane fuselage. If the operator wishes he can elevate platform 35 from his position on seat 21 by manipulating control lever 101 connected to the three-way valve, self-centering 84. Ordinarily, however, the operator will be the only crew member present and his services will be required to transfer the cargo from the truck to the plane. In this event, he will wish to be aboard the platform during its elevation.

The elevation of the platform may be controlled from any one of the four control stations at its respective corners. Assuming that the operator is at one of the rear control stations, he pulls upwardly on the outer end of lever 112 pivoting bell crank counterclockwise as viewed in Figure 2 to shift rigid control link members 110, 107, 105 and 103 in a direction to move the three-way valve piston 97 to the left from its neutral position shown in Figure 9 thereby uncovering the end of conduit 85 and covering the end of conduit 90. Pump 77 is then operable to supply fluid through conduits 81, relief valve 82, conduit 83, past the right-hand end of piston 97 of the three-way valve, and through conduit 85, check valve 86 and into the left-hand end of hydraulic ram 87. It will be understood that orifice check valve 86 is a feature of the invention in that it permits free flow of fluid to the ram cylinder but restricts flow therefrom in the opposite direction thereby safeguarding against lowering the platform too rapidly. So long as the operator holds control lever 112 pivoted upwardly as described, pressurized fluid flows into the ram cylinder to extend piston 87' and apply lifting pressure to outer beam 38 of the scissors. During elevation of the platform, rollers 67 at the upper ends of beam 38 roll along the upper guide rails 66 beneath the platform. Likewise, spur gears 45 supported on the opposite ends of torsion shaft 43 at the lower ends of scissors beam 37 roll along rack gears 46 on the opposite sides of the chassis in unison with the movement of rollers 67 of scissors beam 37. Due to the fact that ram 87 applies a lifting force to scissors beam 38 spur gears 45 tend to rise out of meshing relationship with the rack gears, but this tendency is counteracted by the contact of roller bearing members 48 with the overlying guide rail 52 which holds the spur gears positively in mesh with the rack gears.

The platform continues to rise until the operator either relaxes his grasp or returns the control lever to its neutral position thereby allowing valve piston 97 of the self-centering valve 84 to return to its neutral position shown in Figure 9. When piston 97 of the valve is in this position, the ram piston cannot retract because the fluid is trapped in the ram cylinder and the fluid entering the left-hand end of valve housing 84 returns to tank 80 by way of conduits 90 and 91. It will therefore be understood that the return of lever 112 to its neutral position moves piston 97 of valve 84 to a position blocking the flow of fluid to or from lifting ram 87 and platform 35 remains stationary at the level in which it is then positioned. If the operator wishes to lower the platform, he depresses one of the four control levers such as lever 112 to shift piston 97 of three-way valve 84 to the right from its neutral position illustrated in Figure 9. This allows the fluid to escape from ram 87 into the left end of the valve casing for return to storage tank 80 through return conduits 90 and 91 along with any fluid entering the valve housing from pump 77. The lowering of the platform takes place slowly as is desirable for safety reasons due to the restrictive action of check valve 86 on the return flow of the fluid. Lowering of the platform will be understood to continue until it lies flush against the chassis as illustrated in Figure 7 or until the operator releases control lever 112 for return to its neutral position thereby preventing further lowering movement. Although the raising and lowering of the platform has been described as controlled by lever 112 at one rear corner, it will be recognized that control lever 109 at the left front corner of the platform is operable in the same manner and for the same purpose, as are similar control levers at the other corners of the platform.

So long as the platform is in an elevated position, it will be recognized that an unequal distribution of weight thereon will have a tendency to twist and distort the lower ends of the scissors beams. This tendency is effectively resisted by the lower end of beam 38 because each of its ends are connected to the opposite sides of the chassis frame through fixed pivots 41, 41. The same result is achieved for the traveling pivot at the lower rear ends of scissors beam 37 by reason of the novel stabilizer assembly 42 constituting an important feature of this invention For example, any unequal load distribution on the platform tending to cause one lower end of beam 37 to move rearwardly to a greater extent than its opposite corner is positively prevented by the cooperative action of the two spur gears 45 keyed to the opposite ends of shaft 43 and held in mesh, respectively, with the two stationary rack gears 46 secured to the chassis channel members 12. Accordingly, the two lower ends of beam 37 cannot move disproportionately unless one spur gear revolves to a greater extent than the other. This disproportionate rotation of the two spur gears is positively prevented by the torsional strength of the common supporting shaft 43 and the cooperative action of rack gears 46.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A mobile cargo truck adapted for use in transferring cargo to and from aircraft, said truck having a low-slung horizontally disposed chassis, an engine at the forward end thereof for propelling said truck, a cargo platform overlying the rear of said chassis and movably connected thereto by a pair of rigid frames arranged crisscross of one another and pivotally connected transversely of their mid-sections to provide a vertically extendible scissors support for said platform, hydraulic means powered by said truck propelling engine for raising and lowering said platform, control means for said hydraulic means operable from a control station on said platform, said control means including a hydraulic fluid valve mechanism mounted on said truck, and rigid linkage means extending between said control station and said valve mechanism including a pivoting support therefor mounted on said transverse connection between the mid-sections of said rigid frames, said rigid linkage means being so arranged that the raising and lowering of said platform to any level within its range of movement takes place without affecting the position of the valve controlling the fluid flow for said hydraulic means.

2. In combination with an engine-driven vehicle having a chassis provided with a vertically adjustable cargo platform supported on a pair of scissors beams pivoted together at their mid-sections and having pivotal connections between their forward ends and both said chassis and said cargo platform, hydraulic means including a ram energized by said vehicle engine for raising and lowering said platform, valve means controlling fluid flow to said ram, a control station on said vehicle and a second control station on said platform, and rigid linkage means interconnecting manual control means at each of said stations and said valve means, the portion of said linkage means leading to said second control station having pivotal supports co-axial with the pivotal connection between the mid-sections of said scissors beams and with certain of the pivotal connections between the frame ends and said platform and chassis, respectively, whereby the raising and lowering of said platform takes place without interference with the position of said valve and the control linkage therefor, and whereby said valve may be controlled selectively from either of said control stations.

3. A mobile vertically adjustable cargo platform, a wheeled base therefor, a pair of scissors beams pivotally connected transversely of their mid-sections and having certain of their opposite ends pivotally connected to said platform and to said base, respectively, a hydraulic ram having its lower end connected to the mid-portion of said base at a point spaced below the movable connections of said scissors beams therewith, means operatively connecting the upper end of said ram to the mid-section of the upper half of one of said scissors beams, selectively operable manual control means for controlling the flow of fluid to said ram to raise and lower said platform from spaced apart control stations located on said platform, said control means including a fluid control valve on said wheeled base, rigid linkage means extending between said valve means and control levers at each of said control stations, said linkage means having pivoting supports therefor co-axial with said pivoting connections between said scissors beams and said platform and said wheeled base as well as co-axial with said transverse pivotal connection between said scissors beams, whereby the position of said valve means is not affected by the vertical movement of said platform.

4. In combination with an engine-driven vehicle having a chassis provided with a vertically adjustable cargo platform supported on a pair of scissors beams pivoted together at their mid-sections and having pivotal connections between their forward ends and both said chassis and said cargo platform, hydraulic means including a ram energized by said vehicle engine for raising and lowering said platform, valve means controlling fluid flow to said ram, said valve means including check valve means providing free flow of fluid to said ram during raising of the platform and restrictive flow from said ram during lowering of the platform, a control station on said vehicle and a second control station on said platform, and rigid linkage means interconnecting manual control means at each of said stations and said valve means, the portion of said linkage means leading to said second control station having pivotal supports co-axial with the pivotal connection between the mid-sections of said scissors beams and with certain of the pivotal connections between the frame ends and said platform and chassis, respectively, whereby the raising and lowering of said platform takes place without interference with the position of said valve and the control linkage therefor, and whereby said valve may be controlled selectively from either of said control stations.

5. In combination with a mobile truck frame, a flat cargo platform, an extendible support interposed between said truck frame and said platform, said support comprising a pair of rectangular rigid scissors beams pivotally connected at their mid-sections, means pivotally connecting the adjacent ends of said scissors beams one to said truck frame and one to said cargo platform, the adjacent opposite ends of said scissors beams including means providing a moving connection therebetween and the adjacent portions of said platform and of said truck frame, and an extendible hydraulic ram having a single movable piston means and a cylinder therefor, means pivotally supporting said cylinder spaced below the underside of said truck frame intermediate the opposite ends of said scissors beams, and means connecting the outer end of said piston means to one of said scissors beams adjacent the mid-point of the upper half thereof, said means providing a moving connection between one of said scissors beams and said truck frame including stabilizer means positively constraining the adjacent lower ends of said one scissors beam to move lengthwise of said truck frame by substantially equal increments as said platform is moved to different elevations.

6. The combination defined in claim 5 wherein said stabilizer means providing a moving connection between one of said scissors beams and said truck frame includes a pair of rack gears secured to said truck frame and a pair of shaft-connected pinion gears in mesh with said rack gears and rotatably supported crosswise through the adjacent end of said one scissors beam.

7. In a truck vehicle of the type having a cargo platform and a pair of rectangular scissors beams pivoted together intermediate the ends thereof and interposed between said vehicle and said platform, hydraulic means between said truck vehicle and said scissors operable to raise and lower said platform; that improvement which comprises, a stabilizer device providing a moving connection between said truck vehicle and the lower end of one of said scissors beams, said stabilizer device being remote from and independent of said hydraulic means and including interengaging means between the opposite sides of said truck vehicle and the adjacent portions of said one scissors beam for constraining the opposite lower ends of said one scissors beam to move lengthwise of said truck vehicle by substantially equal increments as said platform is raised and lowered by said hydraulic means.

8. In a cargo vehicle of the type having a vertically extendible platform connected to the upper side of the vehicle chassis by a pair of scissors beams pivotally connected at their transverse mid-sections, means pivotally connecting one pair of the vertically spaced ends of said scissors to said chassis and the other pair to said platform; that improvement which comprises, stabilizer means providing pairs of slot and roller connections between the opposite ends of said scissors beams and said chassis and platform, respectively, one of said pairs of slot and roller connections including a pair of stationary rack gears supported along the opposite sides of said chassis and meshing with a pair of pinion gears having a common supporting shaft journaled transversely through the adjacent end of one of said scissors beams.

9. In combination, a low height cargo handling vehicle having a chassis provided with pairs of front and rear wheels, an engine adjacent said front wheels, a cargo platform overlying a major portion of said chassis, a pair of scissors beams interposed between said chassis and said cargo platform and having their mid-sections pivotally interconnected transversely thereof, one pair of the adjacent ends of said beams being pivotally connected to said chassis and to said platform, respectively, the opposite adjacent ends of said beams being movable along horizontally disposed guide means carried by said chassis and said platform, respectively, a single-stage hydraulic ram for elevating said platform, means projecting below the lower side of said chassis at a point underlying the mid-sections of said scissors beams and to the lower end of which said ram is pivotally connected, means pivotally connecting the opposite movable end of said ram to the upper portion of one of said scissors beams at a point spaced from the upper end of said one beam, and stabilizer means disposed between the horizontally disposed guide means in said chassis and the adjacent ends of said scissors beam adapted to limit the movement of said adjacent beam ends along said guide means to substantially identical increments as said platform is raised and lowered.

10. In combination, a low-height engine-driven cargo truck for use in loading and unloading aircraft, said truck having a horizontally disposed main frame supported between and substantially even with the upper peripheral surfaces of the supporting wheels therefor, a shallow cargo platform overlying said main frame, a pair of scissors beams pivotally interconnected at their transverse mid-sections, means pivotally connecting the forwardly facing ends of said scissors beams one to said truck main frame and one to said platform, respectively, the opposite upper ends of one scissors beam having rollers supported thereon and movable along horizontally disposed guide means supported along the opposite sides of said platform at the rear end thereof, stabilizer means between the lower rear ends of the other scissors beam and the rear ends of the main frame of said truck, said stabilizer means including a pair of rack gears fixed to said truck frame and extending lengthwise along the opposite sides thereof, and a torsion shaft rotatably supported crosswise through the rear ends of said last mentioned scissors beam having spur gears fixed to the ends thereof meshing with the adjacent one of said rack gears.

11. The combination defined in claim 10 including roller means supported on the opposite ends of said torsion shaft, guide rail means extending parallel to said rack gears and disposed on the opposite side of said shaft from said rack gears, said guide rails cooperating with said rollers to hold said spur gears in mesh with said rack gears in all elevated positions of said platform.

12. A truck chassis having a vertically movable platform extending along the upper side thereof, a pair of scissors beams interposed between said platform and said chassis and including hydraulic means for extending said scissors beams upwardly to elevate said platform, the lower end of one of said beams being pivotally connected to said chassis, means slidably connecting the lower ends of the other of said scissors beams to said chassis including stabilizer means operable to prevent one lower corner of said last mentioned scissors beam from moving lengthwise of said chassis independently of the other lower corner while permitting both lower corners of said scissors beam to move in unison with one another.

References Cited in the file of this patent

UNITED STATES PATENTS

| | | |
|---|---|---|
| 1,817,418 | Munns | Aug. 4, 1931 |
| 1,943,325 | Knowles | Jan. 16, 1934 |
| 2,501,001 | Neely | Mar. 21, 1950 |
| 2,643,515 | Harsch | June 30, 1953 |
| 2,764,869 | Scherr | Oct. 2, 1956 |
| 2,797,833 | Cash | July 2, 1957 |